Figure 3:
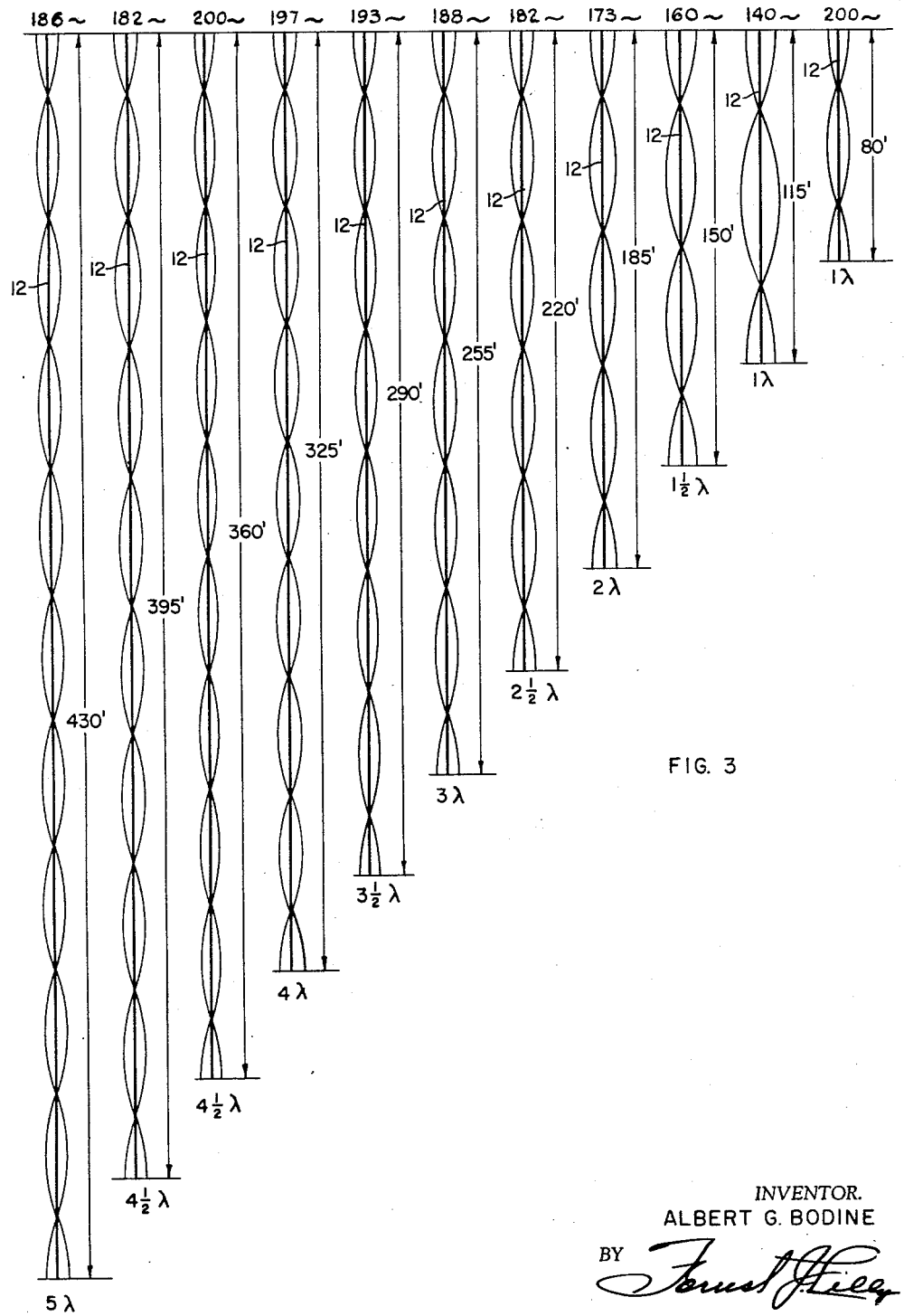

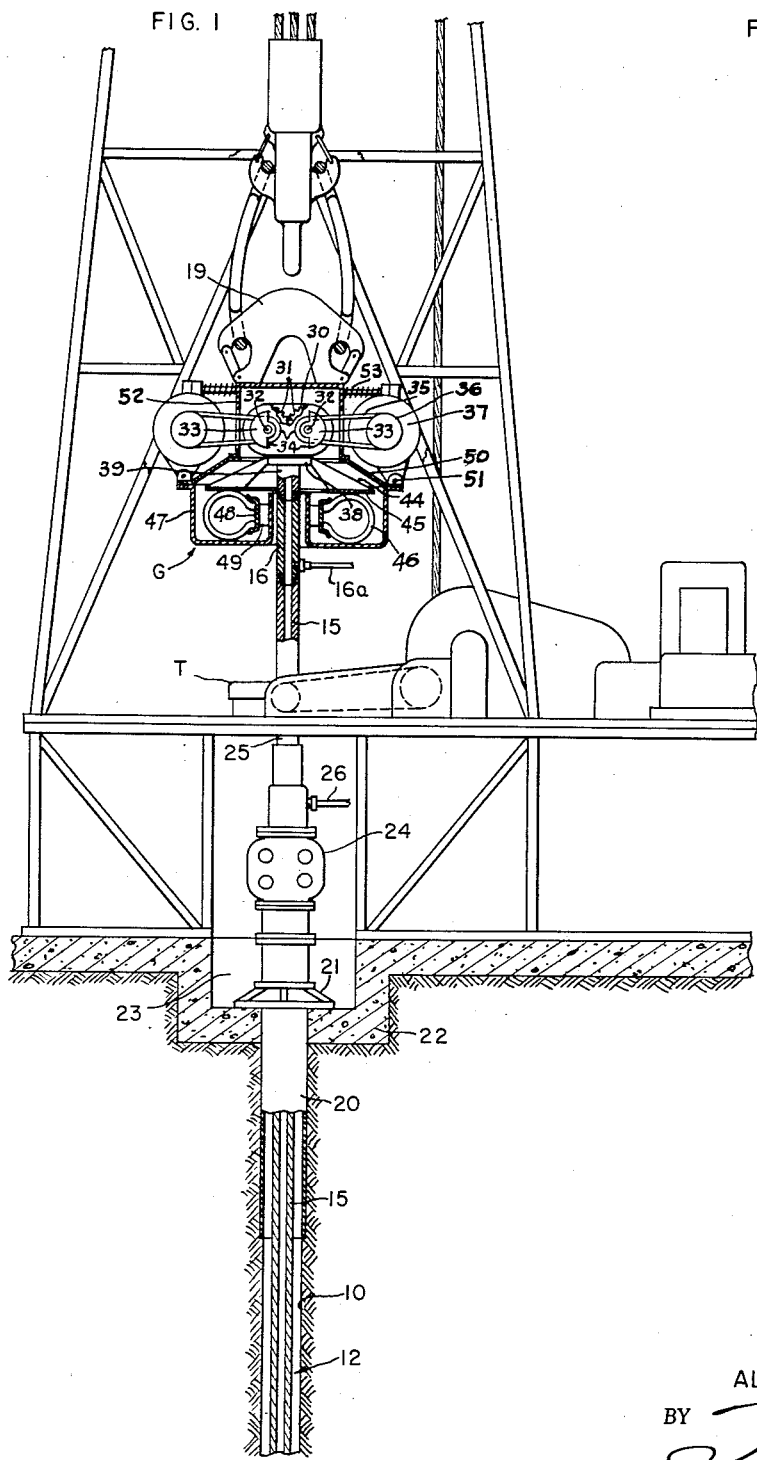

INVENTOR.
ALBERT G. BODINE
ATTORNEY

United States Patent Office 2,942,849
Patented June 28, 1960

2,942,849

METHOD FOR SONIC EARTH BORING BY USE OF RESONANT WAVE PATTERN TRANSMITTED FROM GROUND SURFACE

Albert G. Bodine, 13120 Moorpark St., Sherman Oaks, Calif.

Filed June 2, 1958, Ser. No. 739,313

1 Claim. (Cl. 255—1.8)

This invention relates generally to sonic drilling of earth bores, using sonic drills of the general class represented by my United States Patent No. 2,554,005, but with certain revised organization and method of operation leading to certain important simplifications and improved effectiveness for some particular classes of drilling, particularly at moderate depths.

The sonic drill of my prior patent employs a fixed length longitudinally vibratory bar or column, usually consisting of several intercoupled drill collars, driven at resonance, so as to operate with a longitudinal standing wave therein, a bit on the lower end thereof, and a vibration generator or oscillator coupled to the upper end thereof, this fixed length assembly being lowered into the bore hole on a string of drill pipe.

An object of the present invention is the provision of a novel, simplified method and apparatus for sonic earth bore drilling, particularly for moderate depth drilling, characterized by situation of a simple vibration generator or oscillator at the ground surface, and resonant transmission of the sonic waves to the bit via a resonated vibration column which extends all the way from the vibration generator at the ground surface to the bit.

Other objects are to provide a sonic drilling system which readily permits the imposition of a proportionately large weight on the bit, particularly in drilling of small diameter bore holes, and to provide a sonic drilling system with all mechanically moving parts of the vibration generator above ground where they can be watched and serviced.

The present invention preferably uses a vibration generator of an unbalanced flywheel type. Any given design of a generator of this type has a working frequency range wherein it is effective and useful, but which should not be materially departed from on either the high frequency or low frequency side. The force impulses delivered by such a generator are proportional to the unbalanced weight and to the square of frequency. Accordingly, the force impulses fall off very materially as frequency is lowered, and for a given generator, a lower frequency limit is usually designated, below which the force impulses are considered too weak for profitable operation. On the other hand, for a given design, the bearing loads become excessive when the operating frequency is carried too high, and accordingly, a top frequency limit is generally designated. A typical generator, assumed for purpose of illustration of the present invention, has a useful operating range of from about 140 cycles per second to 200 cycles per second. Of course, the generator may be designed for other useful frequency ranges, and the frequency bracket here given, while preferred, and particularly well-suited to the scale of practical equipment, is not to be considered as limitative. Also, however, there is a preferred frequency range within which earthen formations can be best drilled by sonic methods. Generally speaking, earthen formation gives way best under sonic drilling in a frequency range extending upwards from about one hundred cycles per second.

Bearing in mind the limited frequency range of a given vibration generator, a characterizing feature of the invention is a variation of the sonic wave frequency as the hole is drilled progressively deeper in accordance with a program which always maintains the wave transmission column in a condition of substantial standing wave resonance, with wave frequencies adjusted always to values that are within the designated operating frequency range for a given vibration generator. The process of the invention comprises drilling at a given frequency, within the appropriate frequency range for the generator, and at a resonant frequency of the column for its beginning length; then, as the hole is deepened, and additional column sections are added to the column, correspondingly lowering the generator frequency to preserve the resonant standing wave pattern, the spacing of its nodes and antinodes being increased; and thereafter, when by addition of column sections the length of the column becomes so great that the frequency for resonance drops below the minimum specified for the generator, raising the frequency to find and operate at a higher harmonic, at which resonance is attained at a higher frequency within the specified frequency bracket. This will usually involve adding a half-wavelength to the wave pattern in the column, the nodes and antinodes becoming closer spaced. As the column length is then further increased, step by step, the operating frequency is sometimes lowered, so as to preserve resonance with the same wave pattern, i.e., same number of half-wavelengths, but with increased spacing of nodes and antinodes, when this can be done without going below the minimum specified frequency; and is sometimes raised to a higher resonant overtone, with the addition of one or more half-wavelengths to the wave pattern, with reduced spacing of nodes and antinodes, when this can be done without exceeding the maximum specified frequency.

The invention will be further understood from the following detailed description of an illustrative practice thereof, reference for this purpose being had to the accompanying drawings, in which:

Figs. 1 and 2, taken together, show a sonic oil well drill in accordance with the invention; and Fig. 3 is a diagram showing illustrative sonic wave patterns established in the drill stem according to the invention.

In Fig. 1 of the drawings, numeral 10 designates a well bore being drilled in the earth from ground surface 11, and numeral 12 designates a hollow drill shaft or column, made up of a plurality of lengths 13 suitably screw-coupled to one another, either directly, as here shown, or by use of tool joints. This drill shaft may comprise a string of preferably large and thick-walled drill pipe or the like, in lengths of for example 35 feet, or for some cases, it may comprise a string of solid shaft lengths. The drill shaft is made up of high quality alloy steel, of good elastic fatigue properties, and constitutes a longitudinally elastic column down which the sonic wave energy utilized by the bit is transmitted.

A drill bit 14, of a type suitable for sonic drilling, such as described in my aforementioned patent, is screw-coupled to the lower end of the drill shaft or column 12.

Screw-coupled to the upper end of the shaft 12, or forming an upper portion thereof, is a kelly 15, typically about 70 feet in length, which passes through rotary table T, understood to have the usual slip bowl by which the shaft may be suspended while coupling in added lengths of shaft. A mud fluid sub 16, to which is connected mud inflow hose 16a, is coupled to the upper end of the kelly 15, and coupled in turn to the upper end of sub 16 is a vibration generator or oscillator G, hereinafter more particularly described. The latter includes at the top a hook frame 19, and which in turn will be understood to hang from the usual traveling block and cable suspended in the derrick.

The bore hole 10 is lined for a suitable distance down from the ground surface by surface casing 20, which is supported by landing flange 21 resting on cement footing 22 in the bottom of pit 23. Mounted at the head of casing 20 is any suitable blow-out preventer 24, and above the latter is riser 25 provided with mud flow line 26, this riser being understood to communicate with casing 20 through blow-out preventer 24. The mud flow line discharge is handled conventionally.

The vibration generator G comprises a gear housing 30 containing oppositely rotating meshing spur gears 31 whose shafts 32, which are journalled in suitable bearings in housing 30, carry eccentric weights 33, horizontal components of vibration of which are balanced out, but whose vertical components of vibration coact to produce a substantial oscillatory force in a vertical direction. This oscillatory force is delivered through the shafts 32 and housing 30 to the upper end of the drill string through means presently to be described. The gear shafts carry sprockets 34 connected by chains 35 to drive sprockets 36 on the shafts of two electric motors 37, which are preferably induction motors. These motors are preferably furnished with electric power from a generator driven by a speed-controllable internal engine, not shown.

Affixed to the bottom of gear housing 30 is a flange 38, which is on the upper end of a tubular stem 39 having at its lower end a threaded coupling pin screwed into the box at the upper end of sub 16; and the vertical oscillatory force is delivered to the drill shaft through this stem 39. Secured to the periphery of flange 38 is a conical frame 44 having at the bottom a ring 45 which rests on the side of an inflated pneumatic tire 46, functioning as an air spring. The tire 46 is contained in a housing annulus 47, the rim 48 of the tire being connected to the inner wall of annulus 47, as at 49. Rising from the periphery of annulus 47 is a conical exterior housing wall 50, to which the two motors 37 are pivotally connected, as at 51; and extending upwards from wall 50 is a cylindrical housing 52, atop which is mounted the aforementioned hook frame 19. The belts 35 may be tensioned by means of compression springs 53 acting between housing 52 and the motor housings.

A vibration generator of the rotating eccentric weight type as thus disclosed has a useful frequency range, depending upon its mechanical design. The force impulses delivered by a generator of this type vary, for example, with the unbalanced weight and the square of the frequency. A given generator, accordingly, falls off in effectiveness very rapidly with reduced frequency, and a minimum frequency may arbitrarily be assigned below which the generator should not be operated because of feeble output. Moreover, as frequency is increased, the force impulse climbs rapidly, and for any given design, a maximum operating frequency may be assigned, above which its bearings must be deemed to be unduly stressed, and above which, also, the force impulses may be excessive for the member to be vibrated, in this case, the elastic drill string. For purpose of typical example, a generator such as here shown and described may be regarded as having a typical useful operating range of from about 140 to 200 cycles per second.

Utilizing typical drilling apparatus as thus described, the novel drilling operation in accordance with the invention is as follows: to start the drill hole, the kelly 15 is coupled to the stem 39 of the vibration generator 16, and the bit 14 is coupled initially to the lower end of the kelly. The assembly is then lowered through the rotary drill table until the bit engages the earth, and the vibration generator then operated to deliver an oscillatory force in a vertical direction, which oscillatory force is exerted through the generator housing 30 against the upper end of the stem 39, and, in effect, against the elastic drill column made up of the inter-coupled stem 39, sub 16, kelly 15, drill shaft 12, and bit. The vibration generator is driven at such a speed that the frequency of the vertical oscillatory force exerted on the elastic drill column is a resonant frequency for the vertical length of the column, so that a longitudinal standing wave is established in the column, in accordance with the principles fully discussed in my aforesaid Patent No. 2,554,005, excepting that in this case, the column sustaining the standing wave extends all the way from the bit to the ground surface. In this performance, velocity antinodes appear at the upper and lower ends of the column, and one or more velocity nodes and antinodes intervene therebetween. Assuming a typical case using a kelly of 70 feet in length, a sub 16 and generator stem 39 of several additional feet in length, and a certain amount of "lumped" mass at the top end owing to the weight of the generator, the beginning "column" may be effectively about 80 feet in length. Assuming the usual valve of 16,000 feet per second as the velocity of sound $s$ in the steel column, and a beginning generator frequency $f$ of 200 cycles per second, the length of one full wavelength $\lambda$ in the elastic column is 80 feet, in accordance with the equation $$\lambda = \frac{s}{f}$$

so that the standing wave generated in the column is one wavelength long, and is characterized by a velocity antinode at the lower end of the column, where the bit is connected, a velocity antinode at the top, a velocity antinode at the midpoint of the column, and nodes one quarter-wavelength from each end. Thus, to start operation, in the example given, the internal combustion engine prime mover is driven at such a speed as will cause generator G to operate at a frequency of 200 c.p.s., giving one full wavelength standing wave in the column. Such a wave is shown in the first position (at the right) in the chart of Fig. 3, which indicates wavelengths, operating frequencies, and wave patterns for successive drill column lengths, beginning with 80 feet, and increasing by 35 foot increments.

It may incidentally be mentioned, in connection with the operation of the internal combustion engine prime mover, that an internal combustion engine tends inherently to be torque responsive, and since torque is maximized when the system driven by the engine is operating at resonance, the engine will tend to automatically self-regulate to drive the system at the resonant frequency of the column. This advantageous behaviour, however, is most noticeable and useful if the internal combustion engine is somewhat limited in power, i.e., has just sufficient available power to drive the load. If an overly powerful engine is utilized, this automatic regulating feature is not exhibited, in which case the engine speed may be controlled by use of its throttle. With automatic self-regulation to resonant speed, it is still necessary to open the engine throttle to pass from resonant operation at one frequency to resonant operation at the next higher harmonic. With full manual control, adjustment to resonance frequencies is very easily made owing to very characteristic sound issuing from the equipment at resonance, and with which the operator readily becomes familiar. He may also ascertain resonant operation from drilling rate, which rapidly climbs as resonance is approached.

The system is operated as thus described, with the weight of the drill column and the generator imposed on the bit, and the drill bores into the ground in accordance with general principles described fully in my aforementioned patent.

When the kelly has bored into the ground sufficiently far that the generator G is within a few feet of the rotary table, the generator is stopped, and the equipment hoisted above the rotary table. The bit is removed from the kelly, a section of drill pipe 13 coupled to the lower end of the kelly, and the bit 14 is coupled to the lower end of the pipe 13. The equipment is then lowered to engage the bit with the bottom of the hole, and the generator again driven. At this time, in order to resonate the elastic column with the one wavelength pattern, the generator must be driven at a lower frequency, correlated for resonant performance with the now-increased length of the column. Assuming an added length of 35 feet, the total column length is now effectively approximately 115 feet. The proper resonant frequency for a full wavelength standing wave is now about 140 c.p.s. Accordingly, the internal combustion engine prime mover is driven, either automatically, or by manual control, to operate the vibration generator at the lowered resonant frequency indicated, the wave pattern being longer in number of feet, but still being one wavelength long, and being characterized by an increased spacing of the nodes and antinodes, all as shown in the second position of Fig. 3.

After drilling ahead for an additional 35 feet (the length of the added section of drill pipe), the generator is again stopped, and the equipment hoisted. On this occasion, the drill column is elevated until the upper end portion of the added pipe length 13 is above the rotary table. The slips in the slip bowl of the table are then set to grip and suspend the pipe length 13, a tong is engaged with the kelly to hold the latter stationary, and a power tong is engaged with the pipe length 13, and is operated to unscrew the latter from the kelly. These tongs are conventional and are operated in accordance with conventional practice, and no illustration thereof is deemed necessary. A second pipe length 13, again 35 feet in length, is then coupled to the one held by the table, the kelly coupled to the upper end thereof, again according to conventional practice and with use of conventional tongs. The column is then released from the table, lowered to re-engage the bit with the hole bottom, and the vibration generator again operated. The minimum frequency of 140 c.p.s. having been reached on the preceding occasion, the operating frequency of the vibration generator is this time increased rather than further decreased. Specifically, and for the purpose of the present example, the frequency is increased sufficiently to reach the next higher resonant overtone, giving a standing wave of one and one-half wavelengths in the pipe column, with reduced spacing of the nodes and antinodes, as shown in the third position of Fig. 3. Assuming a second 35-foot length to have been added to the column, the column is now effectively about 150 feet in length, and this length is approximately one and one-half wavelengths for a frequency of approximately 160 c.p.s. The generator is now driven at this increased frequency of 160 c.p.s., giving a one and one-half wavelength standing wave in the drill column.

Thereafter, for a time, as added pipe lengths are added to the string, the generator frequency may be correspondingly increased, to provide shorter wavelength, but a "longer" standing wave pattern, i.e., with one or more additional nodes and antinodes. For example, as lengths of 35 feet are successively added, the total column length may increase as follows: 185 feet, 220 feet, 255 feet, 290 feet, 325 feet, 360 feet, etc. Correspondingly, as each additional pipe length is added, the generator frequency may, for example, be increased sufficiently to add one-half wavelength to the standing wave pattern, giving a series of wave patterns of lengths of $2\lambda$, $2\frac{1}{2}\lambda$, $3\lambda$, $3\frac{1}{2}\lambda$, $4\lambda$, and $4\frac{1}{2}\lambda$. The frequencies of operation, for the series of increased column lengths and wavelengths given immediately above, are accordingly as follows: 173 c.p.s., 182 c.p.s., 188 c.p.s., 193 c.p.s., 197 c.p.s., and 200 c.p.s.

The maximum specified frequency of 200 c.p.s., having now been attained, the same wave pattern, at lower frequency, may then be used with the next addition of a 35-foot length to the column. Thus, for a column length of 395 feet, the number of wavelengths may be held at $4\frac{1}{2}\lambda$, and the frequency for resonance becomes 182 c.p.s.

For the next added 35-foot length, giving a total column length of 430 feet, the wave pattern may optionally be held at $4\frac{1}{2}\lambda$, giving an operating resonant frequency of 168 c.p.s. Similarly, at earlier stages, the wave pattern might have been held constant for more than one column length; for example, at the time the column length was increased from 255 feet to 290 feet, the wave pattern might have been held at $3\lambda$, giving a resonant frequency of 166 c.p.s., instead of 193 c.p.s. for $3\frac{1}{2}\lambda$. Returning to a consideration of the 430-foot column, the wave pattern might alternately be increased to $5\lambda$, giving a resonant operating frequency of 186 c.p.s. The process is continued in this fashion until the full depth of bore has been reached.

It will be seen that a considerable degree of choice is available within the practice of the invention. In general, the procedure comprises the generation, at any given time, of a frequency which is between the assigned limits, here 140 to 200 c.p.c., and which resonates the column, sometimes lowering the frequency and preserving the number of wavelengths with added lengths of column, excepting when by so doing the frequency would fall below the assigned minimum level, optionally increasing the number of wavelengths, as by a half-wavelength, and correspondingly increasing the frequency, excepting when by so doing the frequency would rise above the assigned maximum, always increasing the number of wavelengths with added length of column when preservation of the number of wavelengths would lead to a resonant frequency below the assigned minimum, and always dropping the frequency and avoiding increase in number of wavelengths whenever the assigned maximum frequency would otherwise be exceeded. It will be seen that the number of wavelengths (or half-wavelengths) in the wave pattern in the column is gradually increased with increasing column length, according to a program requiring the wave frequencies to be maintained always within an assigned bracket. In other words, the number of nodes and antinodes in the wave pattern is gradually increased, either continuously, or discontinuously, while always maintaining the number of nodes and antinodes at such numbers that the resonant operating frequency falls within the assigned bracket. It will further be seen that this practice involves, in general, lowering of the wave frequency and preservation (or even dropping) of the number of nodes and antinodes in the wave pattern whenever added column length and an increase in number of wavelengths would result in a resonant frequency above the assigned maximum, and increasing the frequency, and correspondingly the number of nodes and antinodes, whenever added column length and preservation of the number of nodes and antinodes would result in a resonant frequency below the assigned minimum. Thus the frequency of operation is sometimes lowered, and sometimes increased, but held always within the assigned bracket; while the number of half-wavelengths is progressively increased as a general trend.

By the practice of the invention, a given vibration generator is always operated within a frequency range at which it is effective, and below a value at which it would be overstressed.

Sonic drilling under many conditions is greatly facilitated by the practice of the invention. The system assures maintenance of a proportionately large weight on the bit, particularly in drilling of small diameter bore holes. The system has the further advantage that all parts of the vibration generating mechanism are above ground and can accordingly be observed and serviced at any time required without pulling the entire drill string from the hole.

It will of course be understood that the particular mechanical equipment shown and described is for illustrative purposes only, and is subject to considerable variation within the scope of the invention. It will further be understood that the particular drill pipe lengths and operating frequencies given in the foregoing are also to be taken as merely illustrative or typical, and are subject to considerable variation.

I claim:

The method of progressively drilling a deep hole into the earth by use of an elongated elastic drill shaft having a bit connected to its lower end, that comprises: coupling an elastic wave generator of the type having a characteristic working frequency range defined by predetermined maximum and minimum frequency limits in force transmitting relationship to said shaft, operating said generator at a longitudinal elastic standing wave resonant harmonic frequency of said shaft determined by its length and which harmonic frequency is within said characteristic working frequency range, so as to produce in said shaft longitudinal elastic vibrations at a resonant standing wave frequency thereof which is within said characteristic working frequency range of said generator, said vibrations being characterized by a longitudinal standing wave pattern providing a plurality of nodes and antinodes along said shaft, increasing the total length of said shaft as the hole is deepened by adding successive shaft sections thereto, reducing the frequency of said generator and thereby the vibration frequency in said shaft so as to lengthen the spacing of said nodes and antinodes in said shaft in correspondence with increase in shaft length until said predetermined minimum frequency limit is approached, and then, as further shaft sections are added, adjusting the frequency of said generator and thereby the vibration frequency in said shaft within said characteristic working frequency range of said generator to provide generally progressively higher harmonic standing wave patterns in said shaft with correspondingly increasing numbers of nodes and antinodes of reduced spacing.

References Cited in the file of this patent

UNITED STATES PATENTS

| | | |
|---|---|---|
| 2,554,005 | Bodine | May 22, 1951 |
| 2,743,585 | Berthet et al. | May 1, 1956 |